United States Patent [19]

Wilske

[11] 4,219,881

[45] Aug. 26, 1980

[54] DIGITAL INPUT CONTROL CIRCUIT

[75] Inventor: Lowell D. Wilske, Phoenix, Ariz.

[73] Assignee: Honeywell Inc., Minneapolis, Minn.

[21] Appl. No.: 866,000

[22] Filed: Dec. 30, 1977

[51] Int. Cl.³ .......................................... G06F 11/00
[52] U.S. Cl. .................................................. 364/900
[58] Field of Search ... 364/200 MS File, 900 MS File, 364/119, 552, 105

[56] References Cited

U.S. PATENT DOCUMENTS

| | | | |
|---|---|---|---|
| 3,247,498 | 4/1966 | Sadvary et al. | 364/551 |
| 3,324,458 | 6/1967 | McArthur | 364/200 |
| 3,344,406 | 9/1967 | Vinal | 364/900 |
| 3,350,694 | 10/1967 | Kusnick et al. | 340/172.5 |
| 3,704,362 | 11/1972 | Kolby et al. | 364/552 |
| 3,798,612 | 3/1974 | Struger et al. | 340/172.5 |
| 3,825,696 | 7/1974 | Long | 364/900 |
| 3,916,170 | 10/1975 | Norimatsu et al. | 364/105 |
| 3,983,373 | 9/1976 | Russell | 364/119 |
| 4,001,785 | 1/1977 | Miyazaki et al. | 364/900 |
| 4,023,143 | 5/1977 | Braunstein | 364/200 |
| 4,070,702 | 1/1978 | Grants et al. | 364/200 |
| 4,115,847 | 9/1978 | Osder et al. | 364/119 |
| 4,117,317 | 9/1978 | Dooley, Jr. et al. | 364/119 |

*Primary Examiner*—Gareth D. Shaw
*Assistant Examiner*—C. T. Bartz
*Attorney, Agent, or Firm*—L. J. Marhoefer; L. D. Burton

[57] ABSTRACT

A digital input circuit is provided wherein previous digital data is stored in a holding register. Subsequent data is compared with the data in the holding register to determine whether or not a change had occurred in the input data from the primary sensors. If no change is detected, the system effectively "passes" on that scan of the data. If, on the other hand, a change has been detected an interrupt signal is generated for transmission back to the host computer. The host computer may then initiate a "read" sequence. The "read" sequence under ordinary circumstances, includes updating the data in the storage register before enabling the outputting of the digital data.

5 Claims, 5 Drawing Figures

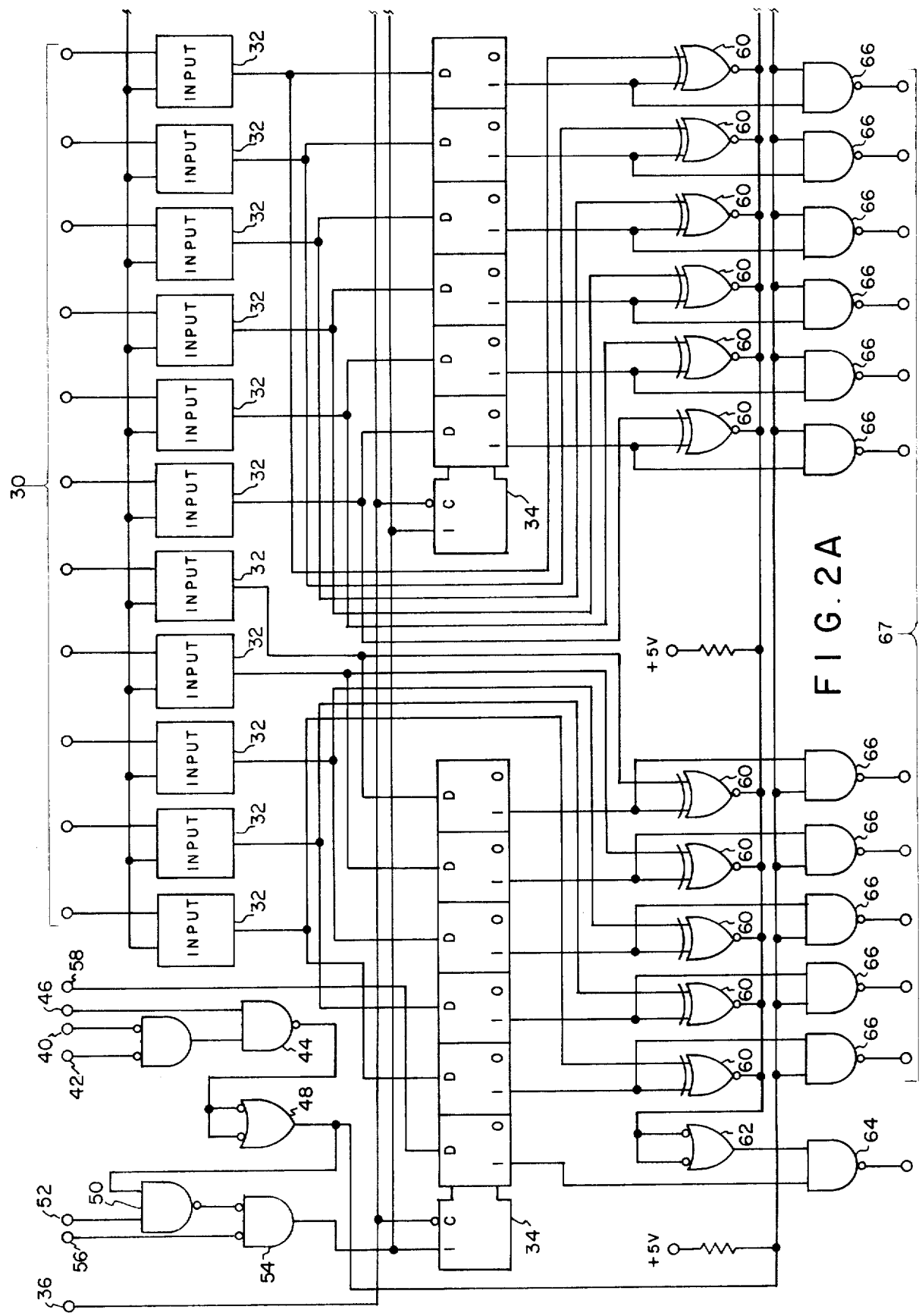

DIGITAL INPUT CONTROL CIRCUIT

BACKGROUND OF THE INVENTION

The present invention relates to process control apparatus. More particularly, it relates to improved digital input circuitry for use with a computer based process control system.

In the art of industrial process control, there have been provided systems wherein various parameters of the process are measured, compared with a desired value, and the difference then being used to derive a control or output signal. In a number of cases, both the input, or measured variable signals, and the output signals are in the form of analog signals. In some cases, however, the primary sensing element produces signals, representative of measured variables, in the form of digital signals. In such systems, a great number of input circuits share the single process control computer on a time scanning basis. In such systems, if all of the digital data is transmitted to the process computer for each of the digital input devices each time the devices are scanned, there would be a great amount of traffic on a communication bus system and tend to slow the response of the system to control the several processes.

SUMMARY OF THE INVENTION

It is, accordingly, an object of the present invention to provide an improved digital input circuit for computer based process control systems.

It is another object of the present invention to provide an improved digital input circuit as set forth which minimizes the need for data traffic between the input device and the process control computer.

In accomplishing these and other objects, there has been provided, in accordance with the present invention, a digital input circuit wherein previous digital data is stored in a holding resister. Subsequent data is compared with the data in the holding register to determine whether or not a change had occured in the input data from the primary sensors. If no change is detected, the system effectively "passes" on that scan of the data. If, on the other hand, a change has been detected, an interrupt signal is generated for transmission back to the host computer. The host computer may then initiate a "read" sequence. The "read" sequence under ordinary circumstances, includes updating the data in the storage register before enabling the outputting of the digital data.

BRIEF DESCRIPTION OF THE DRAWINGS

A better understanding of the present invention may be had from the following detailed description when read in the light of the accompanying drawings in which.

DETAILED DESCRIPTION

Figure 1:
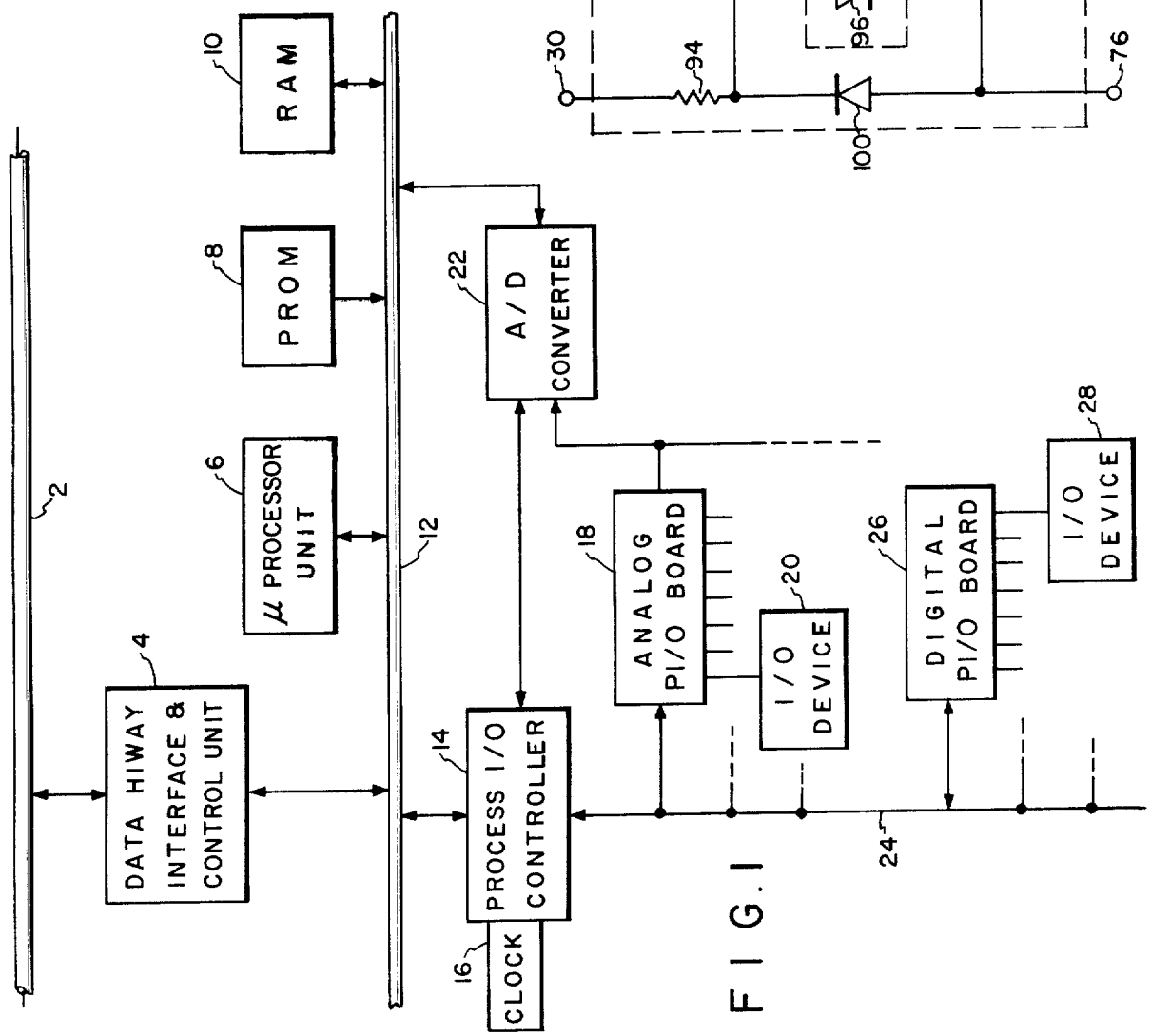
FIG. 1 is a block diagram of a computer based process control system embodying the present invention.

Referring now to the drawings in more detail, there is shown FIG. 1 in block diagram form a computer based control system such as is shown in copending application of Woods et al., Ser. No. 773,913, filed Mar. 3, 1977. In FIG. 1, there is shown a data highway 2, or communication bus, for communication with a host computer (not shown). A data highway interface and control unit 4 interfaces that communication bus with a subordinate control system. The subordinate control system includes a microprocessor unit 6, a PROM 8 in which is stored, among other things, the operational program for the microprocessor unit 6. There is also provided a RAM 10 in which is stored, among other things, data-base tables for each of the data points involved in the control system, as well as a working local memory. These are all interconnected with each other and with the data highway interface control unit 4 by a microprocessor bus 12. Operatively connected to the bus 12 for responsive communication with the microprocessor unit 6 is a process input/output controller 14. The process input/output controller 14 includes a clock 16 which generates a series of clock pulses for the coordinate operation of the apparatus connected to be responsive to the process input/output controller 14. Included among the apparatus connected to the process input/output controller 14 is one or more analog process input/output boards 18 each having up to 8 analog input or output devices 20. An analog to digital converter 22 is connected to the analog process I/O boards 18 to convert the analog signals into digitals for use by the microprocessor unit 6. Further, there are connected to the process I/O controller 14 through the process I/O bus 24, digital process I/O boards 26 to which are connected a plurality of digital input or output devices 28.

Under the control of the microprocessor unit 6, process data is gathered from the analog or digital input devices and is applied through the process I/O controller 14 to the microprocessor unit 6 for manipulation in accordance with the control algorithm for the particular data point. Also under the control of the microprocessor unit, output control signals are applied through the process I/O controller 14 to the analog and/or digital output boards 18 and 26 to their respective control devices or output devices 20 and 28. In the present case, it is the digital input board 26 which is of particular interest.

Figure 2B:
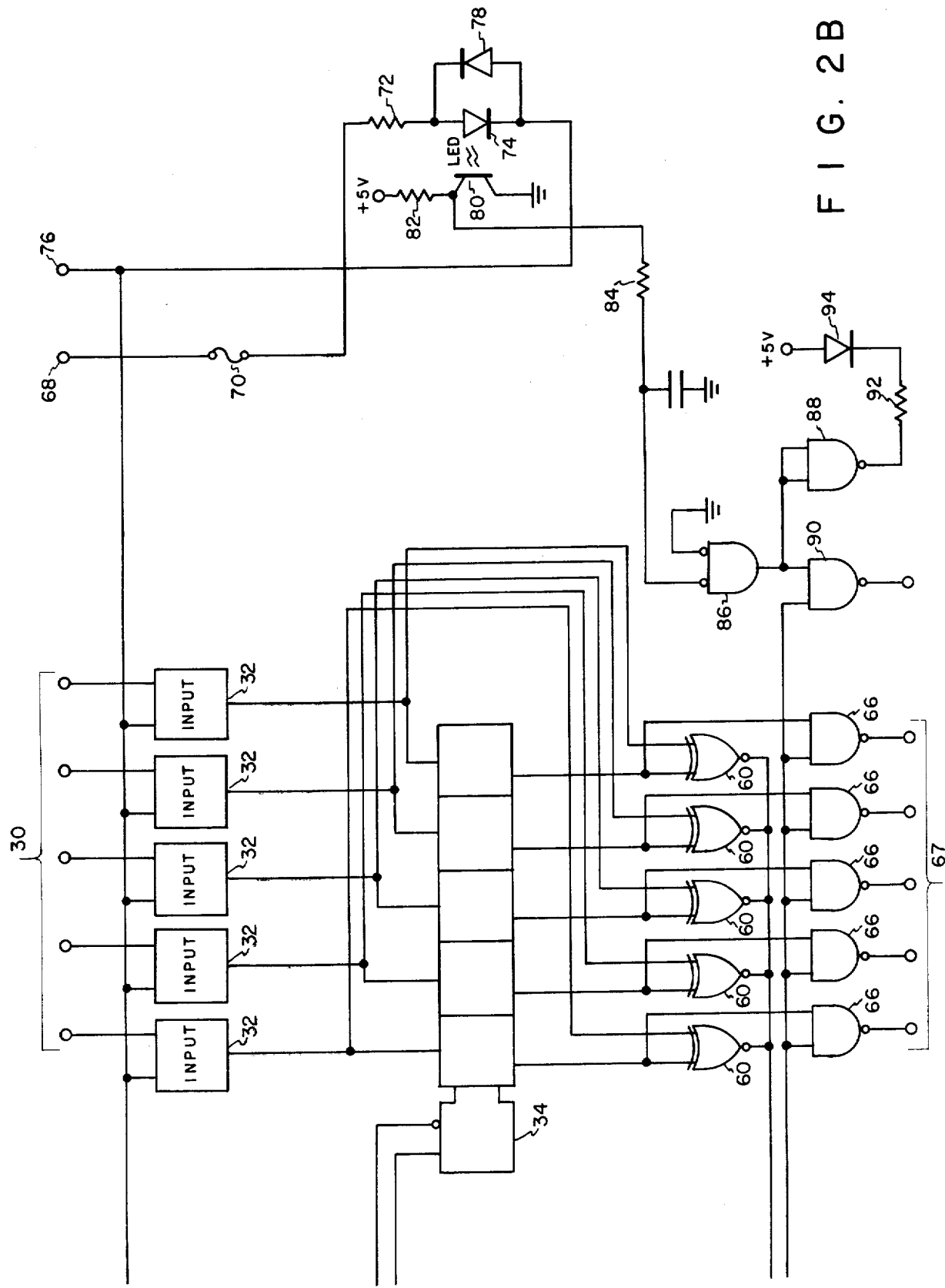
FIG. 2 is a block diagram illustrating the assembly of FIGS. 2A and 2B which are, in turn, schematic logic diagrams of a digital input circuit board embodying the present invention.

To this end, there is shown in FIG. 2 (FIG 2A and 2B) a detailed logic diagram of a digital input circuit such as may be included in the digital input board 26. Digital input information from the primary sensors is applied to the 16 input terminals 30. Each of the input terminals is connected to one of the corresponding number of input signal conditioning circuits 32, respectively. These input circuits will be described in more detail later herein. Holding latch assemblies are provided for storing the signals applied thereto from the input circuits. To accommodate the 16 input circuits, there are provided three six-segment holding latch assemblies 34. These holding latches are effectively composed of six flip-flops with independent input and output circuits but having common control circuits. These holding latches are illustrated in schematic form and may be of a commercial type identified as SN74LS174 manufactured and sold by, among others, Texas Instruments, Inc. The output leads from five of the input circuits are connected, respectively, to five of the segments of the left hand latch assembly illustrated in FIG. 2A. The next six input circuits are connected, respectively, to the six segments of the right hand latch assembly shown in FIG. 2A. The remaining five of the input circuits have their output leads connected, respectively, to five of the segments of the latch assembly shown in FIG. 2B. The sixth segment of the latch assembly shown in FIG. 2B is not used and has been omitted from the drawing for purpose of clarity. The "clear" input of each of the latch assemblies is connected to a lead 36 which is arranged to be connected to a "master clear" line in the microprocessor bus and is responsive to such a signal from the microprocessor to clear all of the latches 34.

In order for the input data from the input circuits to be stored in the respective latch segments, the latches must be clocked or toggled. The "toggle" or "clock" input of each of the latch assemblies is connected to an address and control logic network which also responds to appropriate signals from the microprocessor unit. In an exemplary model constructed in accordance with the present invention, the plurality of circuit boards are arranged in a plurality of card file assemblies each having eight slots or individual boards therein. Thus, to address a particular board, the particular card file assembly must be addressed and then the individual board in the selected card file assembly. Those address signals are applied from the microprocessor units to the process I/O controller 14 where the address codes are decoded and control signals applied to the particular input control circuits of the selected card file assembly and board.

To this end, a NAND gate 38 has one input terminal 40 connected to the process I/O controller 14 through the I/O bus 24 and is responsive to the "card file assembly" selection signal. The other input terminal 42 of gate 38 is also connected to the process I/O controller 14 through the bus 24 and is responsive to the "slot" or board selection signal. The output of the gate 38 is connected to one input terminal of a NAND gate 44, the other input terminal of which is connected to an input terminal 46. The terminal 46 is arranged to be connected to be responsive to a "bus direction" (read or write) signal. The output of the gate 44 is connected to the input terminals of an inverter 48. The output of the inverter 48 is connected to one input terminal of a NAND gate 50, the other input terminal of which is connected to an input terminal 52 which, in turn, is connected to be responsive to a special control signal from the microprocessor. The output of the gate 50 is connected to one input terminal of a NAND gate 54, the other input of which is connected to an input terminal 56. The terminal 56 is connected to receive from the microprocessor unit a "read strobe" signal. The output of the gate 54 is connected to the "toggle" input terminal of each of the latch assemblies 34. An input terminal 58 is connected to the input of the sixth latch segment of the left hand latch assembly illustrated in FIG. 2A. The input signal applied to terminal 58 from the microprocessor unit is a signal which is used to enable the outputting of an interrupt request signal.

The output of each of the 16 input circuits 32 is also connected to 1 input terminal respectively of a corresponding number of EXCLUSIVE NOR gates 60. The other input terminals of the EXCLUSIVE NOR gates are connected, respectively, to the output of the corresponding latch elements. Thus, one input terminal of the EXCLUSIVE NOR gates is connected to respond to the previous data stored in the latch assembly elements, while the other input terminals are connected to respond to the current data being presented to the inputs of the latch assembly elements. In this manner, the EXCLUSIVE NOR gates constitute comparators which may be used to determine whether or not there has been a change in the input data from the last time that the data was read. The outputs of the comparators 60 are connected to a common bus, which is, in turn, connected to the input of an inverter 62. The output of the inverter is connected to one input of a NAND gate 64. The other input terminal of the NAND gate 64 is connected to the output of the sixth latch element of the left most latching assembly 34. The input of that latch element, it will be recalled, was connected to the input terminal 58 which was connected to receive an interrupt enable signal from the microprocessor. The output of the NAND gate 64 is connected to be returned to the microprocessor unit to effect a request for an interrupt whenever there has, in fact, been a change detected in the data signals.

The output of the sixteen data segments of the latch assemblies 34 are also connected, respectively, to one input terminal of each of a corresponding plurality of output NAND gates 66. The other input terminals of the sixteen NAND gates 66 are connected to the output of the inverter 48. When the gate 64 has been enabled by a suitable signal from the microprocessor having been applied to the terminal 58 and stored in the sixth element of the storage latch assembly 34, the detection of a change signal at the output of at least one of the comparators 60, an interrupt request signal will be transmitted from the gate 64 to the microprocessor requesting an interrupt. When the interrupt is granted, the particular board is addressed with the appropriate signals being applied to terminals 42 and 40 together with the "read" signal applied to the input terminal 46. The resulting output signal from the gate 44 allows the output of the inverter 48 to assume a logical "high." That "high" applied to the input of the gate 50 together with an appropriate signal from the microprocessor connected to the terminal 52 and a "read strobe" signal applied to the input terminal 56 allows the output of the gate 54 to change from a logical "low" to a logical "high." That change in the output of the gate 54 toggles the three latch assemblies, allowing the new data to be stored into the latch assembly segments. Simultaneously, with the updating of the data in the latch assembly segments, the new data is also applied to the I/O bus 24 by way of the output terminals 67 of the gates 66. The data thus applied to the I/O bus 24 is supplied to the process I/O controller 14 for subsequent reading and transmission to the microprocessor.

If it is required by the control program for the microprocessor to read the old data stored in the latch assemblies without updating the latch assemblies with potentially new data, a logical "low" is applied to the input terminal 52 blocking the gate 50 and, hence, the gate 54, thereby preventing the toggling of the latch assemblies 34. However, the addressing of the board through the gates 38, 44 and inverter 48, enable the gates 66 to read the data then existent at the output terminals of the latch assemblies. Thus the data may be presented to the process I/O controller 14 by way of the bus 34 for transmission to the microprocessor units on demand.

In FIG. 2B, there is also shown a power detection and address response logic. The power detection circuit includes an input terminal 68 to which the positive side of the power supply may be connected. That terminal is connected through a fuse 70 and a resistor 72 to the light emitting diode 74 of an optical isolator. The cathode of the LED 74 is connected to the negative power terminal 76. An oppositely poled bypass diode 78 is connected in parallel with the LED. The light sensitive transistor 80 forming a part of the optical isolator has its emitter connected to ground and its collector connected through a resistor 82 to a referenced voltage supply. The output of the optical isolator is taken at the junction between the collector of the transistor 80 and the resistor 82. That point is connected through a resistor 84 to one input terminal of a NAND gate 86, the other input terminal of which is connected to ground. The output of the gate 86 is connected to the input terminals of an inverting NAND gate 88 and to one input terminal of a further NAND gate 90. The output of the inverter 88 is connected through a resistor 92 and a light emitting diode 94 to a referenced potential source. Thus, when current flows from the terminal 68 through the fuse 70 and the LED 74 back to the terminal 76, the LED 74 is illuminated, energizing the transistor 80. When the transistor 80 is conductive, current flows from the referenced source through the resistor 82 to ground. That produces a logical "low" at the collector of the transistor 80 which is applied through the resistor 82 to the input terminal of gate 86 thus causing the gate 86 to produce a logical "high" at the output thereof. The "high" at the output of the gate 86 causes a logical "low" to appear at the output of the inverter 88. When the output of the inverter 88 goes "low," current flows from the reference source through the LED 94 and the resistor 92 causing the LED 94 to glow as an indication that the particular board is indeed powered up. The "high" at the output of the gate 86, when applied to the one input terminal of the gate 90 enables that gate to respond to the board address signal appearing at the output of the inverter 48 when a particular board has been addressed by the microprocessor. When the gate 90 is "made," a signal is returned from the output thereof to the microprocessor indicative that the addressed board is present and is powered up.

Figure 3:
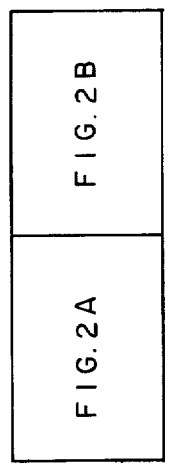
FIG. 3 is a schematic diagram of a digital input circuit element illustrated in FIG. 2.
Figure 3:
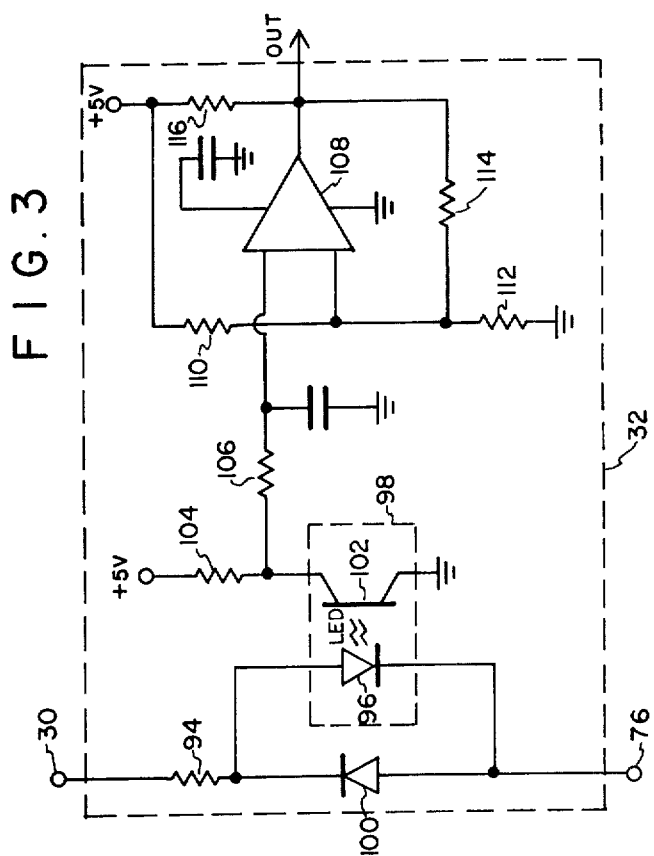

In FIG. 3, there is shown a schematic diagram of a typical input circuit 32 shown in FIGS. 2A and 2B and embodied in the present invention. As shown in FIG. 3, the input terminal is connected through a resistor 94 through a light emitting diode 96 of an optical isolator 98 to the negative power supply terminal 76. An oppositely poled protective diode 100 is connected in parallel with the LED 96. The light sensitive transistor 102 forming a part of the optical isolator 98 has its emitter connected to ground and its collector connected through a resistor 104 to a reference potential source. The junction between the collector of the transistor 102 and the resistor 104 is connected through a coupling resistor 106 to the inverting input of a comparator 108. The non-inverting input of the comparator is connected to a junction between a resistor 110 and a resistor 112; the resistors 110 and 112 being serially connected between a reference voltage source and ground. These two resistors thus comprise a voltage divider reference point for the comparator. A feedback resistor 114 is connected between the output of the comparator 108 and a non-inverting input thereof. An output pull-up resistor 116 is connected between the reference source and the output of the comparator.

When a signal is applied to the input terminal 30, current flows through the resistor 94 and the LED 96 to the return terminal 76. The LED is thus illuminated exciting the transistor 102 to conduction and producing a logical "low" signal at the inverting input of the comparator 108. That, in turn, produces a logical "high" at the output terminal thereof. That logical "high" is applied as input signal through the corresponding one of the latch elements 34 and to the input terminal of the associated EXCLUSIVE NOR gate 60, whereby the signals may be detected and/or read out as hereinbefore described.

The input circuit of FIG. 3 as well as the power detection circuit illustrated in FIG. 2B have been shown as though the input signal were of a positive polarity with a ground return. If, on the other hand, the applied input signals were such that the positive terminal of the power supply circuit were the common return and the data signals themselves were of a negative polarity, then the polarity of the LEDs 74 and 96 would be reversed as would the polarity of the bypass diodes 78 and 100. Other than that, the circuits would be substantially the same.

Inasmuch as only change signals need to be transmitted back to the central processor over the data highway, there has been effected an improvement in the traffic necessary to be accommodated by the highway. Thus it may be seen that there has been provided, in accordance with the present invention, an improved digital input signal circuit which features an improved economy of highway traffic and is reliable and accurate.

The embodiments of the invention in which an exclusive property or privilege is claimed are defined as follows:

1. A digital computer based process control system including a digital data input control circuit and digital computer means for supplying digital control signals to and receiving digital data signals from said data input control circuit, said digital data input control circuit comprising:

a plurality of digital data input terminal means for receiving digital data from process sensors:

a plurality of input signal conditioning circuits corresponding in number to said plurality of input terminal means, individual ones of said input terminal means being connected respectively to an input of corresponding ones of said input signal conditioning circuits;

a plurality of holding latch elements corresponding in number to the plurality of said input signal conditioning circuits, said holding latch elements each having an independent input and output means;

a signal change detector including a plurality of signal comparator means each having a first and a second input means corresponding in number to said plurality of input signal conditioning circuits and each having an output means to produce an output signal indicative of a difference in the signals applied to the corresponding first and second input means thereof;

means connecting said output means of said signal change detector to said computer means to initiate a control signal therefrom;

means connecting the output of each of said input signal conditioning circuits to said input means of corresponding ones of said holding latch elements;

means also connecting the output of each of said input signal conditioning circuits to corresponding ones of said first input means of said comparator means;

means connecting said output means of each of said holding latch means to corresponding ones of said second input means of said comparator means;

signal responsive logic control means, responsive to said control signal, connected for controlling the selective operation of said holding latch means;

said logic control means including means connected to be responsive to address signals and function control derived from control signals supplied by said computer means;

a plurality of selectively operable output circuit means corresponding in number to said data input terminal means each having an input terminal means, an enabling terminal means and an output terminal means;

means connecting said input terminal means of each of said output circuits means to corresponding ones of said output means of said holding latch elements and means connecting said output terminal means of said output circuit means to said digital computer means, as input signals thereto; and means including said logic control means connected to said enabling terminal means of said output circuit means for controlling the selective operation of said output circuit means.

2. A digital computer based process control system as set forth in claim 1 wherein said input signal conditioning circuits include isolating means for electrically isolating said data input terminal means from the outputs of said signal conditioning circuits, said signal conditioning circuit being further characterized in that the input data signals are conditioned to be compatible with the remainder of said digital data input control circuit.

3. A digital computer based process control system as set forth in claim 1 wherein said digital data input control circuit includes power detection circuit means including optical isolating means connected to be responsive to energizing power for said input control circuit to provide a signal indicative of an energization of said input control circuit.

4. A digital computer based process control system as set forth in claim 1 wherein said comparator means are arranged to compare previous input data stored in said latch elements with current input data from said signal conditioning circuits and to produce an output signal indicative of a signal change, and means responsive to said comparator output signal to initiate a transmission of the changed current data to said computer means.

5. A digital computer based process control system as set forth in claim 4 wherein said signal responsive logic control means include means responsive to said initiation of transmission of the changed current data to load said changed current data from said signal conditioning circuits into said holding latch means for transmission to said computer means.

* * * * *